(12) United States Patent
Hu et al.

(10) Patent No.: US 9,767,266 B2
(45) Date of Patent: Sep. 19, 2017

(54) METHODS AND SYSTEMS FOR BIOMETRIC-BASED USER AUTHENTICATION BY VOICE

(71) Applicant: The MITRE Corporation, McLean, VA (US)

(72) Inventors: Qian Hu, Lexington, MA (US); Stelios Melachrinoudis, Framingham, MA (US); Joshua Kraunelis, Lowell, MA (US); Stanley Boykin, Stoughton, MA (US); Matthew Coarr, Auberndale, MA (US)

(73) Assignee: THE MITRE CORPORATION, McLean, VA (US)

( * ) Notice: Subject to any disclaimer, the term of this patent is extended or adjusted under 35 U.S.C. 154(b) by 0 days.

(21) Appl. No.: 14/136,664

(22) Filed: Dec. 20, 2013

(65) Prior Publication Data

US 2015/0178487 A1 Jun. 25, 2015

(51) Int. Cl.
| | |
|---|---|
| *G11C 7/00* | (2006.01) |
| *G06F 17/30* | (2006.01) |
| *G06F 13/00* | (2006.01) |
| *G06F 12/14* | (2006.01) |
| *G06F 12/00* | (2006.01) |
| *G06F 7/04* | (2006.01) |
| *G06F 21/32* | (2013.01) |
| *G10L 25/48* | (2013.01) |
| *G06K 9/00* | (2006.01) |
| *G10L 25/51* | (2013.01) |

(52) U.S. Cl.
CPC ......... *G06F 21/32* (2013.01); *G06K 9/00899* (2013.01); *G10L 25/48* (2013.01); *G10L 25/51* (2013.01)

(58) Field of Classification Search
CPC ....................................................... G06F 21/32
USPC ............................................................ 726/19
See application file for complete search history.

(56) References Cited

U.S. PATENT DOCUMENTS

| | | | | |
|---|---|---|---|---|
| 6,470,077 | B1 * | 10/2002 | Chan | 379/88.01 |
| 6,480,825 | B1 * | 11/2002 | Sharma | G07C 9/00158 |
| | | | | 704/270 |
| 6,507,730 | B1 * | 1/2003 | Caspers et al. | 455/103 |
| 7,184,521 | B2 * | 2/2007 | Sikora et al. | 379/69 |
| 8,589,167 | B2 * | 11/2013 | Baughman et al. | 704/270 |
| 2002/0128835 | A1 * | 9/2002 | Iso | G10L 21/038 |
| | | | | 704/247 |
| 2007/0185718 | A1 * | 8/2007 | Di Mambro | G06F 21/32 |
| | | | | 704/273 |
| 2009/0043586 | A1 * | 2/2009 | MacAuslan | 704/270 |

(Continued)

OTHER PUBLICATIONS

Anastasis Kounoudes; Voice Biometric Authentication for Enhancing Internet Service Security; Year:2006; IEEE; p. 1020-1025.*

*Primary Examiner* — Monjour Rahim
(74) *Attorney, Agent, or Firm* — Sterge, Kessler, Goldstein & Fox P.L.L.C.

(57) ABSTRACT

Disclosed herein are system, method, and computer program product embodiments for authentication of users of electronic devices by voice biometrics. An embodiment operates by comparing a power spectrum and/or an amplitude spectrum within a frequency range of an audio signal to a criterion, and determining that the audio signal is one of a live audio signal or a playback audio signal based on the comparison.

25 Claims, 10 Drawing Sheets

(56) References Cited

U.S. PATENT DOCUMENTS

2010/0131273 A1* 5/2010 Aley-Raz ............... G10L 17/24
              704/247
2012/0290297 A1* 11/2012 Baughman et al. .......... 704/233
2013/0259211 A1* 10/2013 Vlack et al. ............... 379/88.01
2014/0072156 A1* 3/2014 Kwon ........................... 381/318
2014/0369479 A1* 12/2014 Siminoff .................... 379/88.01

* cited by examiner

METHODS AND SYSTEMS FOR BIOMETRIC-BASED USER AUTHENTICATION BY VOICE

BACKGROUND

Electronic devices, for example smartphones and tablet computers, have become widely adopted in society for both personal and business use. However, the use of these devices to communicate sensitive or confidential data requires, among other things, strong front/end-user authentication procedures and/or protocols to protect the sensitive or confidential data, the devices themselves, and the integrity of networks carrying such data.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
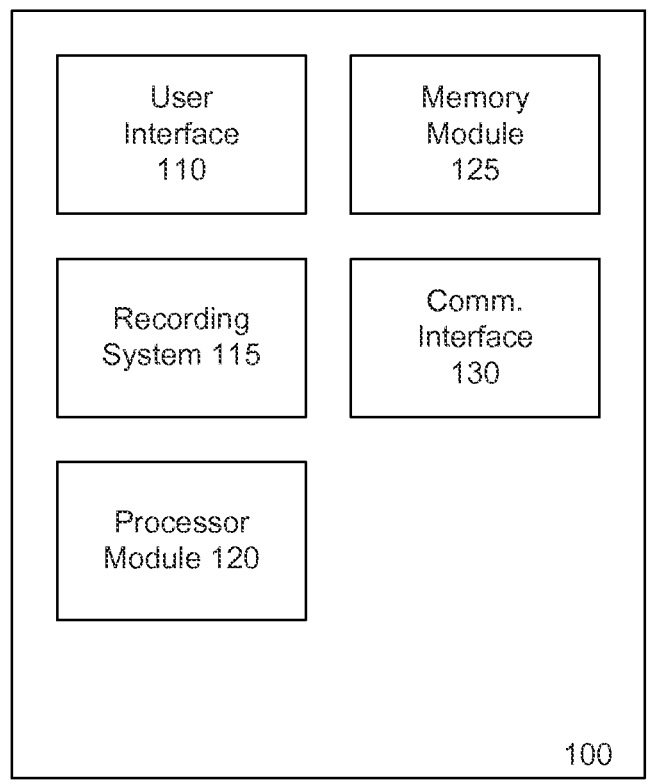
FIG. 1 is a block diagram of a device featuring user authentication, according to an exemplary embodiment.

Provided herein are system, method and/or computer program product embodiments, and/or combinations and sub-combinations thereof, for authentication of users of electronic devices such as, for example and not as limitation, mobile phones, smartphones, personal digital assistants, laptop computers, tablet computers, and/or any electronic device in which user authentication is necessary or desirable.

The following Detailed Description refers to accompanying drawings to illustrate various exemplary embodiments. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

For purposes of this discussion, the term "module" shall be understood to include one of software, firmware, or hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Conventionally, user authentication procedures include asking a front/end-user to type an alphanumeric password on a physical or touch-screen keyboard, or to draw a pattern on a touchscreen display. Such procedures, however, can be vulnerable to theft or obtained through coercion. For example, a password could be stolen and used to access a password-protected device.

Other user authentication procedures are based on biometric markers, and may include recognition of markers such as a user's fingerprint or voice. In the case of voice, a device may include a voice verification system from a commercial product that recognizes one or both of the frequency/tone of the user's voice and the text of the message spoken (such as a spoken password) to authenticate a user. Therefore, devices that use biometric markers for user authentication could provide strong security. However, a user's voice may be obtained and recorded through, for example, coercion, and played back to the corresponding device to obtain access.

FIG. 1 illustrates a device 100 featuring user authentication via voice verification according to an exemplary embodiment. Device 100 may be embodied in, for example and not as limitation, a mobile phone, smartphone, personal digital assistant, laptop computer, tablet computer, or any electronic device in which user authentication is necessary or desirable. Device 100 includes a user interface 110, a recording system 115, a processor module 120, a memory module 125, and a communication interface 130.

User interface 110 may include a keypad/display combination, a touchscreen display that provides keypad and display functionality, or a communication interface such as, for example and not as limitation, Bluetooth, which allows remote control of the device via short range wireless communication, without departing from the scope of the present disclosure.

Processor module 120 may include one or more processors and or circuits, including a digital signal processor, a voice-verification processor, or a general purpose processor, configured to execute instructions and/or code designed to process audio signals received through the recording system 115, to calculate a power spectrum and/or an amplitude spectrum of the received audio signals, and to analyze the audio signals to determine if the audio signal originated from a user (e.g. from a live audio source) or from a playback device (e.g. a playback audio source).

Memory module 125 includes a storage device for storing data, including computer programs and/or other instructions and/or user data, and may be accessed by processor 120 to retrieve such data and perform functions described in the present disclosure. Memory module 125 may include a main or primary memory, such as random access memory (RAM), including one or more levels of cache.

As will be explained in further detail below with respect to various exemplary embodiments, in operation, a user seeking access to device 100, or to particular functions or sub-systems therein, enables a user authentication function within device 100 and speaks into the recording system 115. The user may speak any word or phrase or may speak a particular word or phrase that has been previously enrolled through some administrative witness/verification. Device 100 generates an audio signal corresponding to the user's spoken word or phrase and processes the audio signal to determine if the user is authorized to access device 100 or particular functions or sub-systems therein. Device 100 may determine, among other things, if the received audio is from a live audio source or from a playback device, and may grant access to the device and/or particular functions or sub-systems if it is determined that the received audio is from a live audio source and matches the enrollment voice profile.

Figure 2:
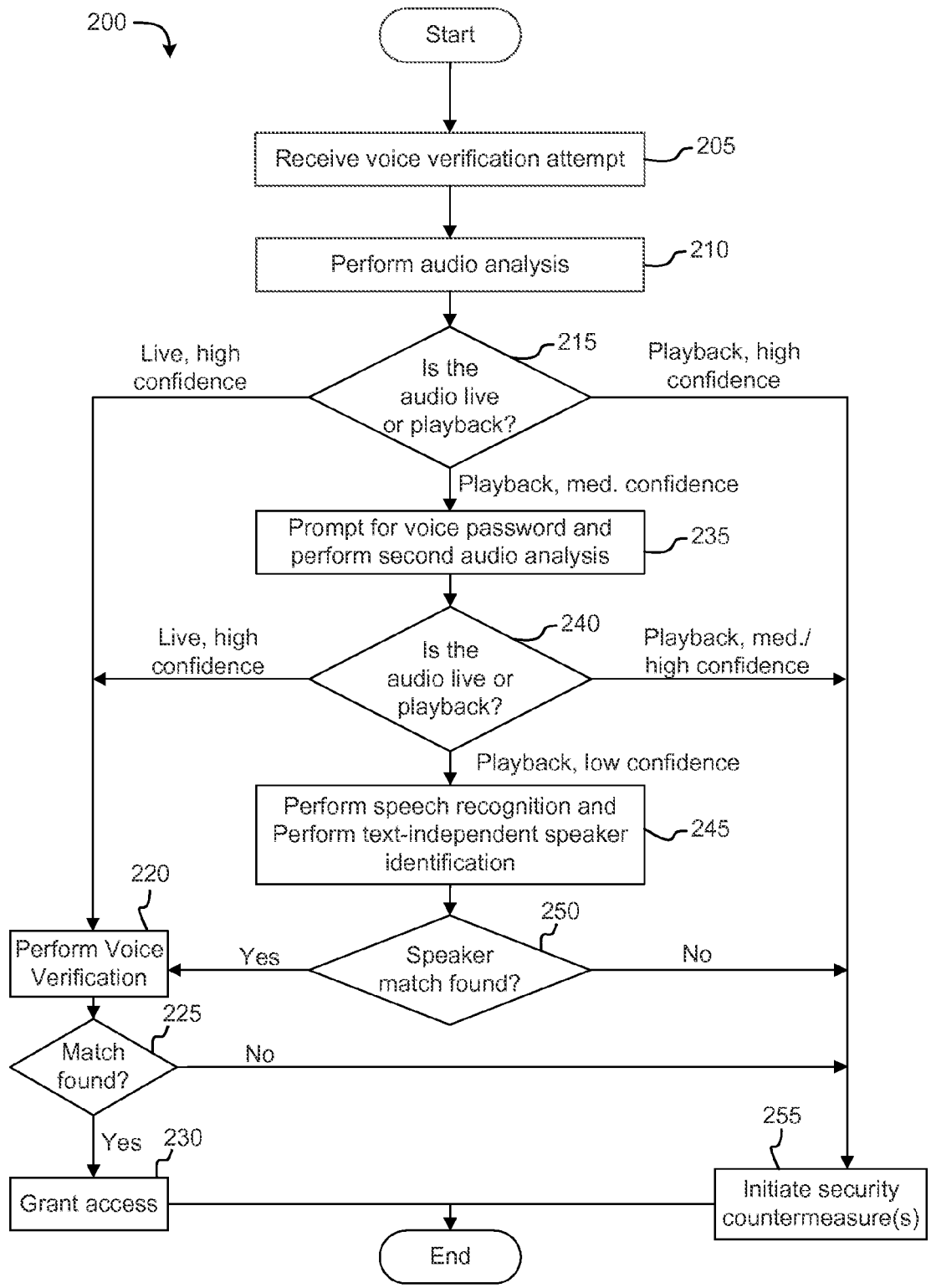
FIG. 2 is a flowchart illustrating a process of determining user access, according to an exemplary embodiment.

FIG. 2 is a flowchart illustrating a process 200 of determining user access, according to an exemplary embodiment. Process 200 may be, for example, implemented within device 100 of FIG. 1, as a voice biometric system for authenticating users of the device 100. The authentication of users may occur at an initial access attempt to the device 100 in general by a user, on a specific activity basis selected by the user for enhanced protection by active (activity-based) authentication (such as an access attempt to a particular application stored on device 100), at timed intervals throughout a user's interaction with the device 100 for continuous (time-based) authentication (for example as defined by the user or a system administrator), or any combination of the above.

At step 205, device 100 may receive a voice verification attempt, for example received as sound through the recording system 115 of a device. The sound may be received from a user attempting to access the device 100, some particular function of device 100, or some combination thereof. In an embodiment, this received sound may be converted to an audio signal for processing.

At step 210, device 100 may perform an audio analysis of the audio signal to determine whether the user should be authenticated for the desired user and/or purpose. This analysis may be performed, for example, by processor module 120. In an embodiment, this voice verification attempt constitutes a first audio analysis to determine whether it is from a live source or a playback of a recording and then voice verification that is text-dependent. This text dependency may be in the form of checking that the sound received through the recording system 115 matches a pre-determined voice password. The text dependency may additionally require that the voice, as well as the spoken voice password, have a 1-to-1 correspondence with the pre-determined, and previously enrolled, voice password.

The results of the audio analysis may include a confidence level of the analysis, e.g. high confidence, medium confidence, and low confidence that the audio signal is from a live source or a playback device. These levels of confidence are by way of example only. As will be recognized by those skilled in the relevant art(s), more or fewer levels of confidence may be used. In an embodiment, the levels of confidence are generated with respect to whether the audio signal represents a live source or a playback device. The levels of confidence may additionally reflect the computed confidence by the commercial voice verification system that the spoken content of the audio signal matches the pre-determined voice password. These results may be combined into a composite level of confidence for both the likelihood of the source being a live source and the match to the pre-determined voice password. Alternatively, there may be a separate level of confidence output for each individually. For purposes of simplicity, the following discussion will describe the process 200 with respect to a level of confidence associated with the likelihood of the audio signal being from a live source.

As will be discussed in more detail below with respect to the remaining figures, the audio analysis may utilize a computed power spectrum of the audio signal, a computed amplitude spectrum of the audio signal, or some combination of the two, to determine whether the audio signal was generated from a live source (e.g., a user physically speaking directly into the recording system 115 of a device) or from a playback device (e.g., a device playing back recorded sound when held close to the recording system 115).

At step 215, the processor module 120 determines whether the audio signal is from a live source or a playback of a recording, based on the results of the audio analysis at step 210. At step 215, the processor module 120 also analyzes the level of confidence and takes a specific action depending on the level. If the processor module 120 determines that the audio signal is from a playback device with high confidence, the process 200 proceeds directly to step 255 to engage a security countermeasure or a set of security countermeasures. The security countermeasure may be any one or more of at least denying access to the device 100 (or, where verification was required for only an application or set of applications, then denial for that application only), collecting biometric data from the illicit attempt(s), and shutting down the entire system of the device 100. If the processor module 120 determines that the audio signal is possibly from a playback device (e.g., with medium confidence), the process proceeds to step 235 as will be discussed in more detail below. If the processor module 120 determines that the audio signal is not from a playback device but rather a live source with high confidence, then the process 200 proceeds to step 220.

At step 220, the processor module 120 performs voice verification using a commercial engine. If there is match found at step 225 between the live audio signal with the pre-enrolled voice profile, for example a match with a system or user-specified confidence threshold, the process 200 proceeds to step 230 and grants the requested access. If a verification match is not found at step 225 between the live audio signal and the pre-enrolled voice profile, or a match is found that is below the system or user-specified confidence threshold, the process 200 proceeds to step 255 and engages a security countermeasure or a set of security countermeasures.

Returning to step 215, if the processor module 120 determines that the level of confidence is medium that the audio signal is from a playback device (or that the level of confidence is medium that the audio signal is from a live source), then the process 200 instead proceeds to step 235 to prompt the user for another authentication input.

At step 235, device 100 may receive a second voice verification input. This received sound may be converted to a second audio signal for processing. At step 240, the processor module 120 may again perform an audio analysis on the audio signal from the second voice input to determine the likelihood that the source is a live source or from a playback device, as discussed above with respect to step 215.

At step 240, the processor module 120 also analyzes the level of confidence generated from the second audio signal analysis at step 235 to determine whether it is, e.g., high, medium, or low. If the processor module 120 determines that the level of confidence is high that the second audio signal is not from a playback device but rather a live source with high confidence, then the process 200 proceeds to step 220, discussed above.

If, at step 240, the processor module 120 determines that the level of confidence is high or medium that the audio signal from the second voice input is from a playback source, then the process 200 proceeds to step 255. At step 255, the processor module 120 initiates a security countermeasure or a set of security countermeasures to protect the device 100 from unauthorized access, for example as discussed above.

Returning again to step 240, if the processor module 120 determines that the level of confidence is low that the audio signal from the second voice input is from a playback device, then the process 200 proceeds to step 245 to perform audio analysis and additional speaker identification. This speaker identification may include both the collection of a voice input (such as a voice print via recording system 115, for example) that is text independent as well as voice responses of one or more text-dependent security questions. In an embodiment, an authorized user for the device 100 may have previously set up the one or more security questions with answers using voice input.

At step 245, the processor module 120 analyzes the collected voice input as well as the responses to the text-dependent security questions. In an embodiment, the processor module 120 first compares characteristics of the collected voice input with a stored voice profile for the authorized user for the device 100. The stored voice profile may be stored locally, for example in the memory module 125 of the device 100. Alternatively, the stored voice print may be remote from the device 100 in a voice print database on a network. The voice responses to the security questions are compared to the pre-determined answers. In an embodiment, correct responses to the security questions may result in enrollment of an otherwise unidentified user. Alternatively, correct answers to the security questions will not result in an access grant when the voice input does not match the stored voice profile. As part of the analysis at step 245, the processor module 120 generates positive or negative results for use at step 250.

At step 250, if the processor module 120 determines that matches are found for both the voice input, such as a speaker identification, and the voice responses to the security questions, then the process 200 proceeds to step 220. In an embodiment, the match is determined at step 250 based on a positive result generated by the processor module 120 at step 245. Otherwise, the processor module 120 will proceed to step 255 where the processor module 120 initiates a security countermeasure or a set of security countermeasures to protect the device 100 from unauthorized access, for example as discussed above.

Figure 3:
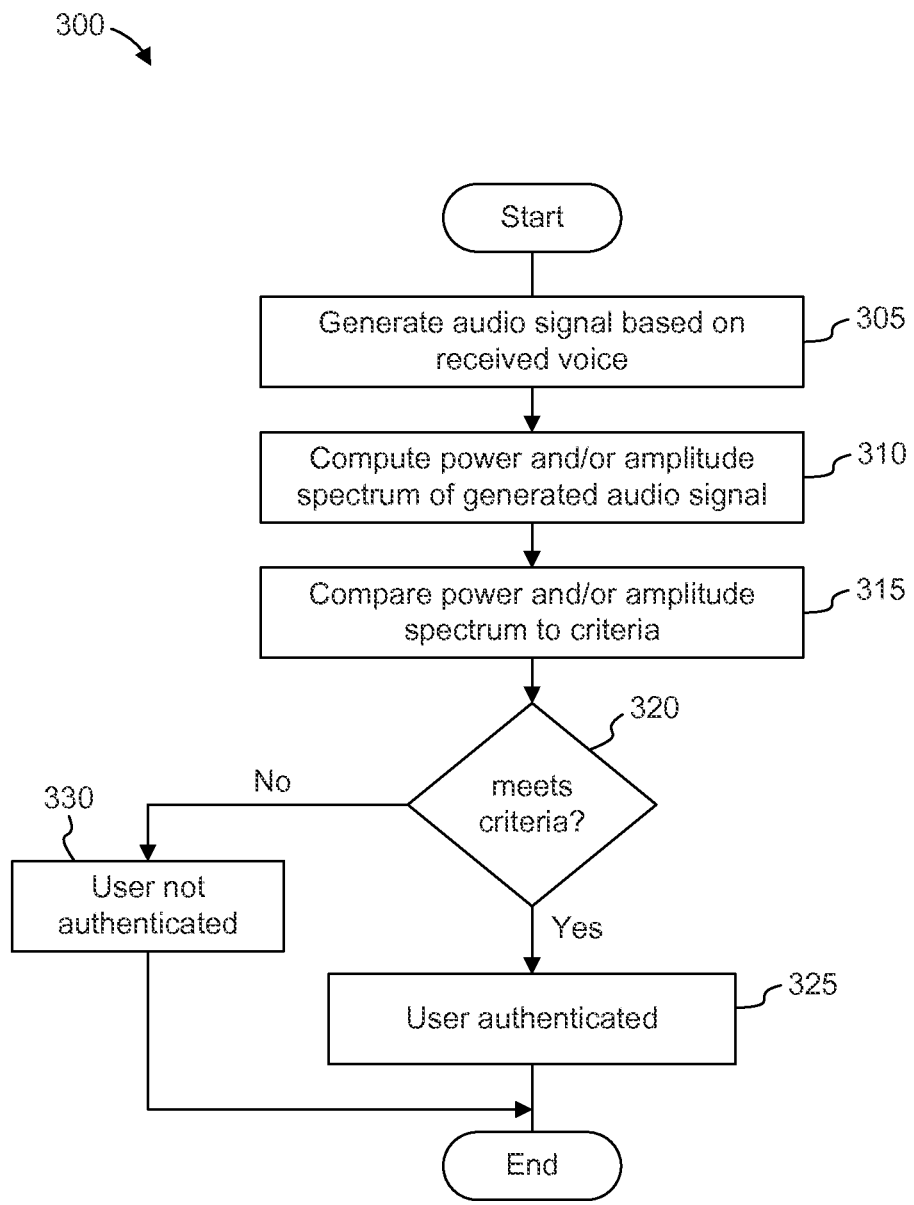
FIG. 3 is a flowchart illustrating a process for authenticating a user, according to an exemplary embodiment.

FIG. 3 is a flowchart of a process 300 for user authentication through voice analysis according to an exemplary embodiment. In an embodiment, process 300 illustrates an embodiment of step 210 of process 200. Alternatively, process 300 may be a process used independently of process 200. At step 305 an electronic device, such as device 100 illustrated in FIG. 1, generates an audio signal from sound received through the recording system 115.

At step 310, processor module 120 processes the audio signal and computes at least one of a power spectrum and an amplitude spectrum of the audio signal, as will be discussed in more detail below with respect to the remaining figures.

At step 315, processor module 120 compares the computed power spectrum and/or amplitude spectrum of the audio signal to criteria. The criteria may include a characteristic of a spectrum of a live audio signal (e.g., from a live audio source instead of from a playback device) along at least one frequency range of the spectrum, such as, for example and not as limitation, the slope of the spectrum along at least one frequency range, the average peak or peaks of the spectrum along the at least one frequency range, and a comparison of peak values of the spectrum along one of the at least one frequency range with peak values along another of the at least one frequency range. The criteria may be stored in memory module 125 and retrieved by processor module 120 for the comparison.

At step 320, processor module 120 determines if the computed spectrum of the audio signal meets the criteria to qualify as a live audio signal. If the computed spectrum meets the criteria, the user is authenticated (step 325) and the process ends. If, on the other hand, the computed spectrum does not meet the criteria, the user is not authenticated (step 330) and the process ends.

Figure 4:
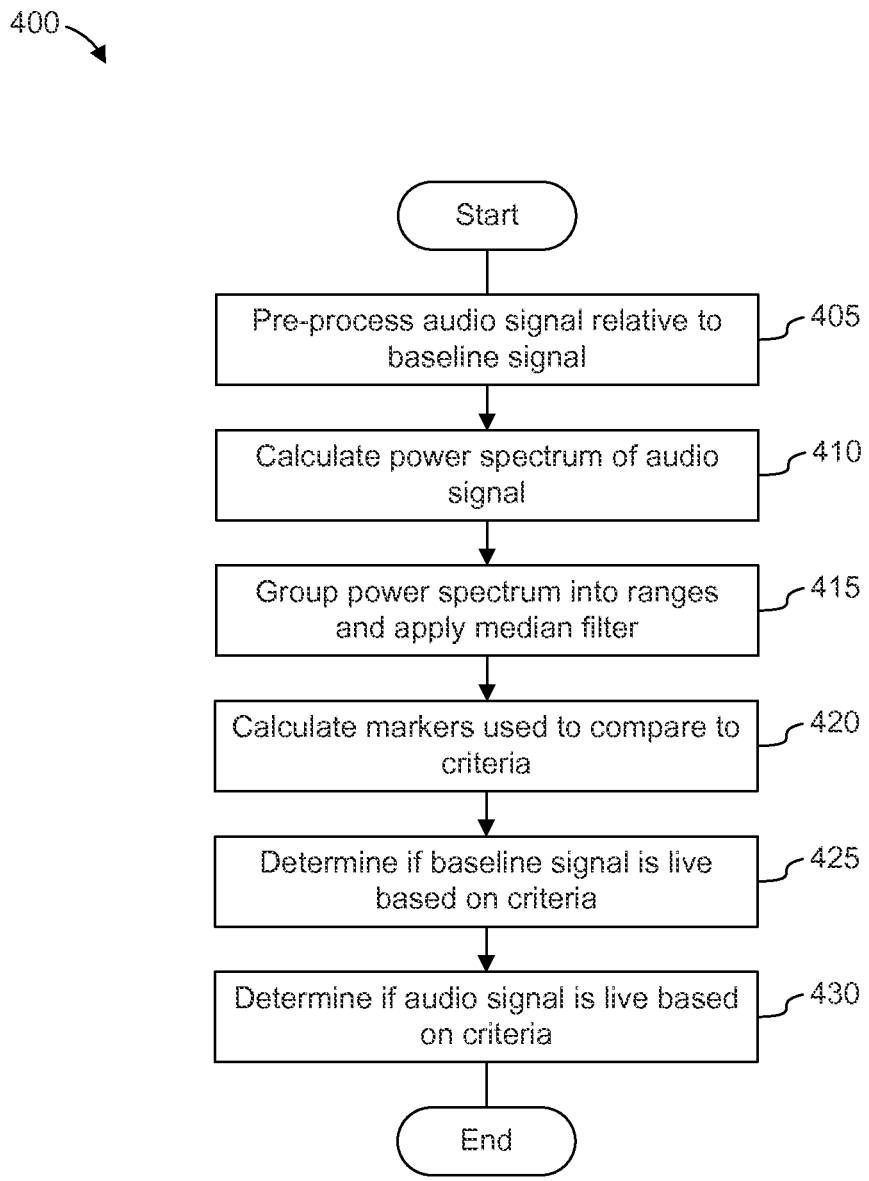
FIG. 4 is a flowchart illustrating a process for determining if an audio signal is from a live source or from a playback device, according to an exemplary embodiment.

FIG. 4 is a flowchart of a process 400 for determining if an audio signal is from a live source or from a playback device according to an exemplary embodiment. In particular, process 400 illustrates determining if the audio signal is from a live audio source based on a power spectrum of the audio signal.

At step 405, an audio signal generated based on a user's spoken word or phrase is pre-processed relative to a previously recorded baseline audio signal, which has been stored, for example, in the memory module 125. In an embodiment, the pre-processing may be performed by the processor module 120. The pre-process may include aligning the generated audio signal with the baseline audio signal. For example and not as limitation, such alignment may be implemented using the "alignsignals" function of the MATLAB computing program ("MATLAB"). The pre-process may further include eliminating excess content on one or both signals such as, for example and not as limitation, periods of silence or background noise.

The pre-process may further include normalizing the generated audio signal and the baseline audio signal to 0 dB Full Scale (dBFS). In an embodiment, such normalizations may be implemented via MATLAB using the equations:

$$z_{pN}[n]=z_p[n]/\max(\text{abs}(z_p[n]))$$

$$x_{pN}[n]=x_p[n]/\max(\text{abs}(x_p[n]))$$

Where $z_p[n]$ is the preprocessed baseline audio signal before normalization, $x_p[n]$ is the preprocessed generated audio signal before normalization, $z_{pN}[n]$ is the preprocessed and normalized baseline audio signal and $x_{pN}[n]$ is the preprocessed and normalized generated audio signal.

At step 410, the power spectra for the generated audio signal and baseline audio signal are calculated. For example, a Power Spectral Density (PSD) estimate may be calculated on $x_{pN}[n]$ using Welch's method to result in a power spectrum for the generated audio signal. In an embodiment, the PSD estimate uses a Fast Fourier Transform (FFT) to calculate the estimate. The FFT length may be of size 512 using a sample rate of 8 kHz, a Hamming window, and a 50% overlap. This PSD estimate may be obtained by using the "pwelch" function of MATLAB. Those skilled in the relevant art(s) will recognize that the power spectrum of these signals may be calculated using other methods and/or parameters without departing from the scope of the disclosure.

At step 415, the power spectra of both audio signals are grouped based on various frequency ranges, and each group is subjected to a median filter. As just one example, a first group may include frequencies from 25 Hz to 300 Hz, a second group may include frequencies from 80 Hz to 400 Hz, and a third group may include frequencies from 1.1 kHz to 2.4 kHz. These ranges are approximate, and those skilled in the relevant art(s) will recognize that the groups may include other frequencies, and/or more or less groups may be used, without departing from the scope of the disclosure. The median filter may be implemented using the "medfilt1" function of MATLAB, using an order of 5 for the first group and an order of 3 for the second and third groups. The median filter may be implemented in other ways, and/or using other parameters, without departing from the scope of the disclosure as will be recognized by those skilled in the relevant art(s).

At step 420, the groups are further processed to calculate markers that will be compared to the criteria for determining if the generated and baseline audio signals are from a live audio source or from a playback device. Calculation of the markers includes calculating the slope of the power spectrum of the generated audio signal and the baseline audio signal within the first group of frequencies, for example by the processor module 120. The processor module 120 also locates the peaks of the second and third groups for the power spectrum of the generated audio signal and the baseline audio signal. In an embodiment, the peaks may be found with an implementation of the "findpeaks" function of MATLAB, using a minimum peak distance of 2 and a number of peaks set at 15. The peaks may be found using other function(s) and/or using other parameters, as will be recognized by those skilled in the relevant art(s).

The calculation further includes calculating the mean of the peaks found for the second and third groups for the power spectra. The processor module 120 may then find a difference between the mean of the peaks by subtracting the mean of the peaks of the third group from the mean of the peaks of the second group for the power spectra of the baseline and generated audio signals. The resulting differences may be compared to the criteria.

In an embodiment, the criteria may include several different thresholds for different aspects of the computed values above, as will be discussed in more detail with respect to steps 425 and 430.

In an embodiment, several values may be computed and derived from the power spectra of the baseline and generated audio signals in step 420 and used in the determination at steps 425 and 430. These values may include $d_{1L}$, $d_{2L}$, and $d_{3L}$. For example, a result of the difference between the mean of the peaks for the baseline audio signal may be designated as $d_{1L}$. Further, a power corresponding to the first frequency bin in the first group may be subtracted from a maximum power corresponding to the first group and be designated as $d_{2L}$. Also, a power corresponding to the first frequency bin in the first group may be subtracted from a power corresponding to the last frequency bin in the first group and be designated as $d_{3L}$. As will be recognized by those skilled in the relevant art(s), more or fewer values may alternatively be computed.

The values $d_{1L}$, $d_{2L}$, and $d_{3L}$ may be compared against respective thresholds $D_{thres1}$, $D_{thres2}$, and $D_{thres3}$, which may have default corresponding values of 9 dB, 2 dB, and 0 dB. As will be recognized, other values may be set in place of these default threshold values. If any one or more of the values $d_{1L}$, $d_{2L}$, and $d_{3L}$ are less than their respective thresholds, it is likely that the baseline audio signal is from a playback source. If each of the values $d_{1L}$, $d_{2L}$, and $d_{3L}$ are greater than the respective thresholds, then it is likely that the baseline audio signal is from a live audio source.

The result of this determination influences how other values are computed. For example, when all the values $d_{1L}$, $d_{2L}$, and $d_{3L}$ are greater than their respective thresholds, a predetermined threshold $D_{thres1newM}$ may be computed as $D_{thres1newM} = d_{1L}/D_{midfactor}$, where $D_{midfactor}$ may have a default value of 1.5. If any one or more of the values $d_{1L}$, $d_{2L}$, and $d_{3L}$ are less than their respective thresholds, however, then $D_{thres1newM} = D_{thres1}/D_{midfactor}$. The predetermined threshold $D_{thres1newM}$ is the one that is compared against the difference between the mean peaks of the third group and the second group of the power spectrum of the generated audio signals as discussed above.

At step 425, the processor module 120 determines whether the baseline audio signal is from a live audio source or playback device. The processor module 120 may make the determination on the basis of one or both of two tests—the first being whether the slope of the first group has an increasing trend and the second being whether the difference between mean peaks of the third and second groups is greater than a predetermined threshold. First, if the slope of the power spectrum of the baseline audio signal for the first group is positive or greater than a specified threshold (for example increasing proportional to the frequency from a beginning peak to a maximum peak), the baseline audio signal is likely to be from a live audio source. Furthermore, if the difference between the mean peaks of the third group and the second group of the power spectrum is higher than a predetermined threshold, the baseline audio signal is likely to be from a live audio source. In such embodiments, the processor module 120 may use the results of these additional calculations to determine whether the generated audio signal is likely from a live audio source or from a playback audio source or device in combination with the same two tests when process 425 proceeds to step 430.

At step 430, the processor module 120 determines if the generated audio signal is from a live audio source or from a playback audio source. In an embodiment, the processor module 120 may make the determination on the basis of one or both of the two tests—the first being whether the slope of the first group has an increasing trend and the second being whether the difference between mean peaks of the third and second groups is greater than a predetermined threshold. First, if the slope of the power spectrum of the generated audio signal for the first group is positive or greater than a specified threshold (for example increasing proportional to the frequency from a beginning peak to a maximum peak), the generated audio signal is likely to be from a live audio source. Furthermore, if the difference between the mean peaks of the third group and the second group of the power spectrum is higher than a predetermined threshold, the generated audio signal is likely to be from a live audio source. The criteria may additionally include thresholds calculated from and for the baseline audio signal.

The above steps of FIG. 4 have been organized for sake of simplicity of discussion. As will be recognized by those skilled in the relevant art(s), some of the steps may be performed concurrently with each other and parts of several of the steps may alternatively be performed as separate steps.

Figure 5:
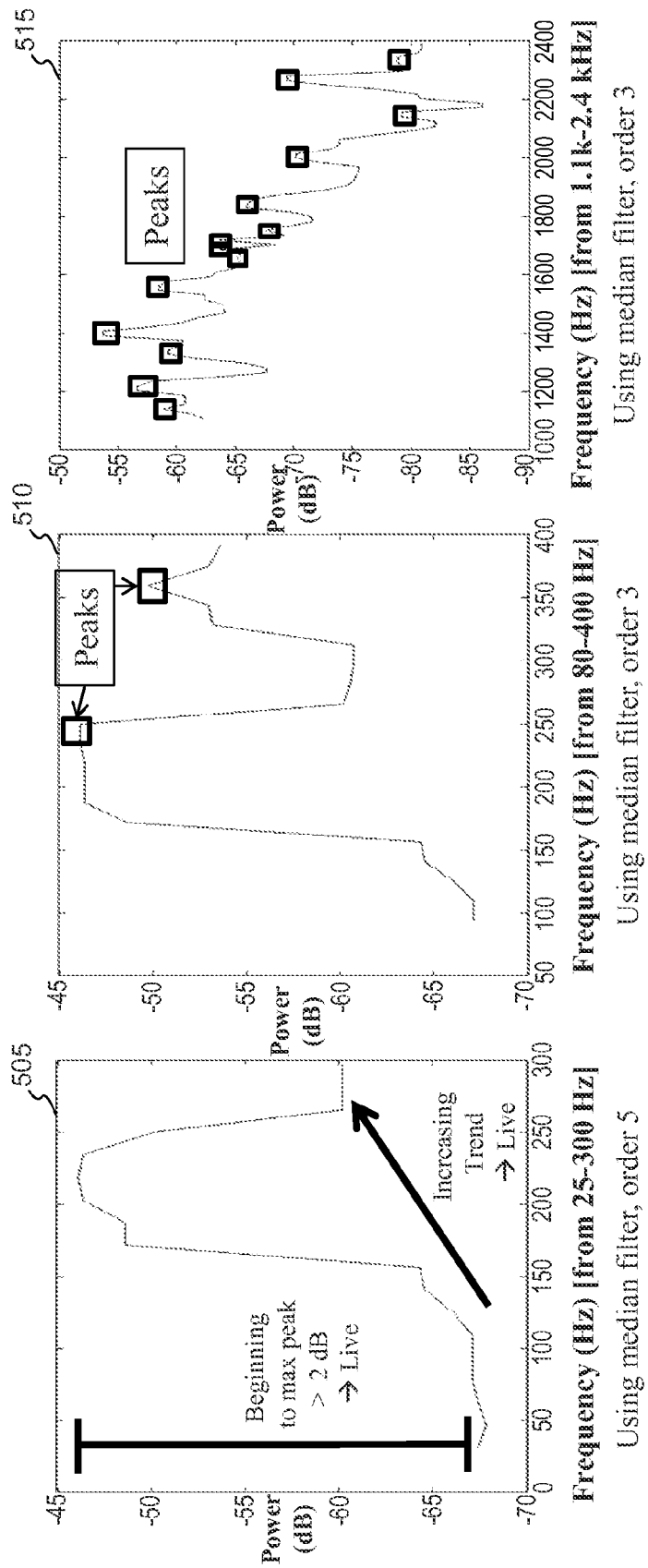
FIG. 5 illustrates exemplary graphs of a power spectrum of an audio signal, according to an exemplary embodiment.

FIG. 5 illustrates graphs of power spectra for three groups of frequencies of a baseline audio signal according to an exemplary embodiment. Graph 505 shows the power spectrum of the first group of a baseline audio signal, for example the baseline audio signal discussed above with respect to FIG. 4, graph 510 shows the power spectrum of the second group of the baseline audio signal, and graph 515 shows the power spectrum of the third group of the baseline audio signal.

Graph 505 shows that the slope of the power spectrum of the first group has an increasing trend. Further, the difference between the low and high peaks is higher than a predetermined threshold (here, 2 dB). Because this satisfies both conditions, it is likely that the baseline audio signal is from a live audio source.

FIG. 5 also shows that the average peak of the power spectrum of the second group is higher than that of the power spectrum of the third group by 16 dB, which is higher than the predetermined threshold (for example the calculated value for $D_{thres1}$). In the example of FIG. 5, the average peak of the second group is approximately −48 dB and the average peak of the third group is approximately −64 dB. A difference of the two average peaks is greater than $D_{thres1}$. Based on the condition of this marker in FIG. 5, it is likely that the baseline audio signal is from a live audio source. These two markers, together, increase the level of confidence that the baseline audio signal is from a live source, although either one alone may contribute to a level of confidence.

Figure 6:
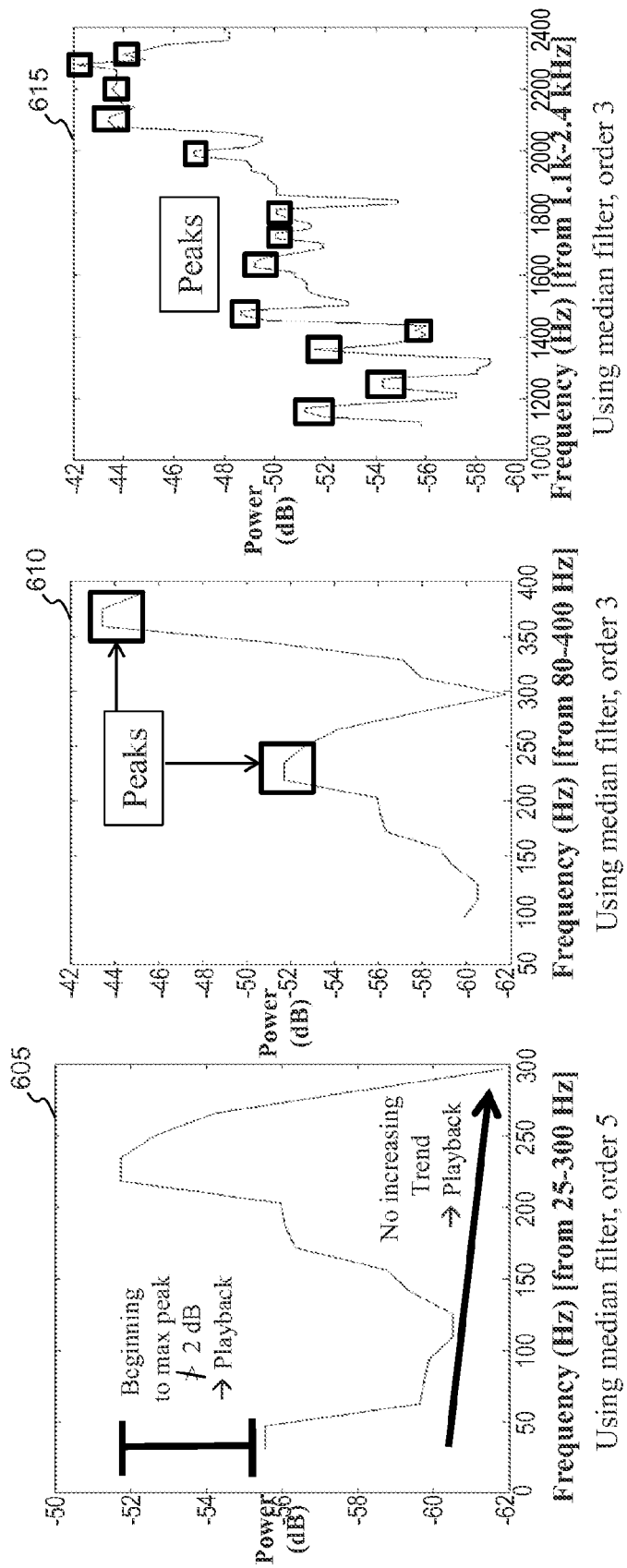
FIG. 6 illustrates exemplary graphs of a power spectrum of an audio signal, according to an exemplary embodiment.

FIG. 6 illustrates graphs of the power spectrum of a baseline audio signal corresponding to three groups of frequencies according to an exemplary embodiment. Graph 605 shows the power spectrum of a baseline audio signal corresponding to the first group of frequencies, for example the baseline audio signal discussed in FIG. 4, graph 610 shows the power spectrum of a baseline audio signal corresponding to the second group of frequencies, and graph 615 shows the power spectrum of a baseline audio signal corresponding to the third group of frequencies.

Graph 605 shows that the slope of the power spectrum corresponding to the first group of frequencies has a decreasing trend. Further, the difference between the low and high peaks is lower than a predetermined threshold (here, 2 dB). Because this does not satisfy either of the conditions, it is likely that the baseline audio signal is from a playback audio source.

FIG. 6 also shows that the average peak of the power spectrum corresponding to the second group of frequencies is higher than that of the power spectrum corresponding to the third group of frequencies by 1 dB, which is lower than the predetermined threshold (for example the calculated value for $D_{thres1newM}$). In the example of FIG. 6, the average peak of the second group is approximately −48 dB and the average peak of the third group is approximately −49 dB. A difference of the two average peaks is less than $D_{thres1}$. Based on the condition of this marker in FIG. 6, it is likely that the baseline audio signal is from a playback audio source.

In addition or as an alternative to the use of power spectra to determine whether an audio signal is from a live or playback source, amplitude spectra may be used.

Figure 7:
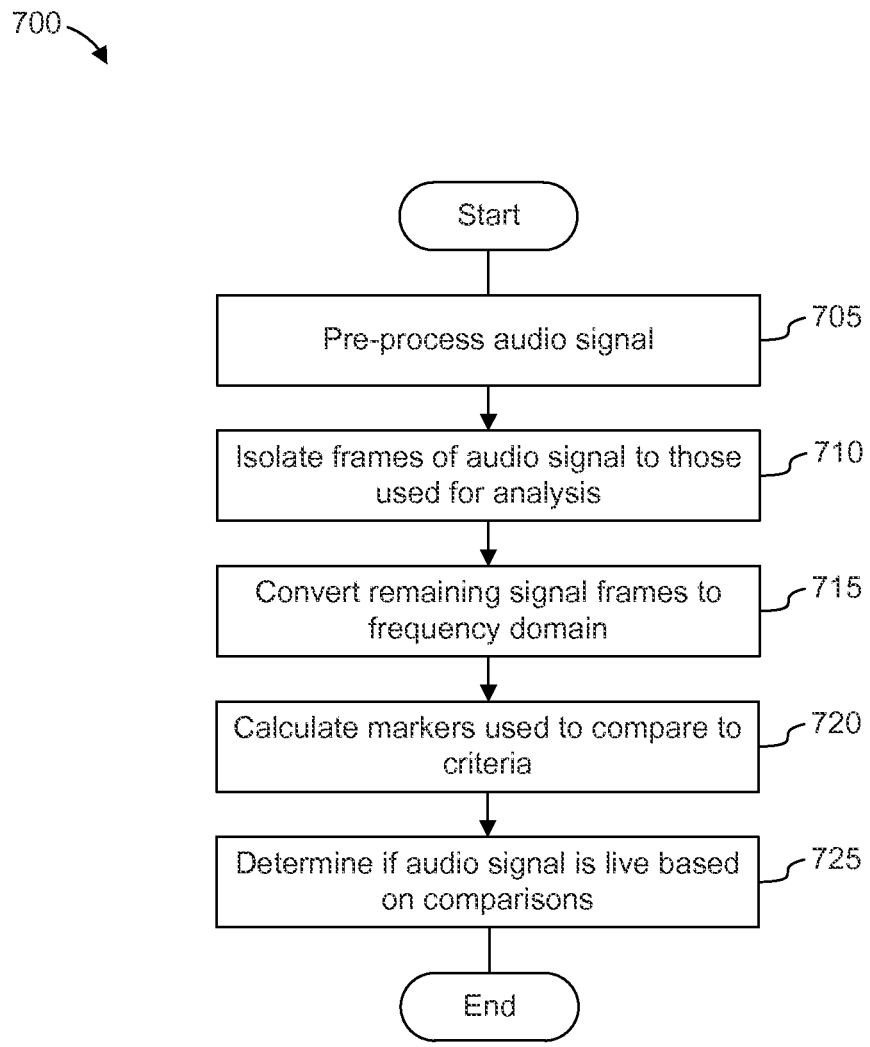
FIG. 7 is a flowchart illustrating a process for determining if an audio signal is from a live source or from a playback device, according to an exemplary embodiment.

FIG. 7 is a flowchart of a process 700 for determining if an audio signal is from a live source or from a playback device according to an exemplary embodiment. In particular, process 700 illustrates determining if the audio signal is from a live audio source based on an amplitude spectrum of the audio signal.

At step 705, an audio signal generated based on a user's spoken word or phrase is pre-processed. In an embodiment, this includes extracting the first 80% of the generated audio signal. As will be recognized by those skilled in the relevant art(s), a larger or smaller percentage may also be used. Pre-processing of the generated audio signal may also include normalization, for example represented by the equation:

$$x_{pN}[n]=x_p[n]/\max(\mathrm{abs}(x_p[n]))$$

where $x_{pN}[n]$ is the preprocessed and normalized generated audio signal and $x_p[n]$ is the preprocessed generated audio signal before normalization.

At step 710, the individual segments of audio signal $x_{pN}[n]$ are analyzed to isolate those frames that likely contain actual signal activity. For purposes of discussion, frames herein are composed of individual segments containing discrete values of the generated audio signal, for example as sampled by an analog-to-digital converter.

Figure 8:
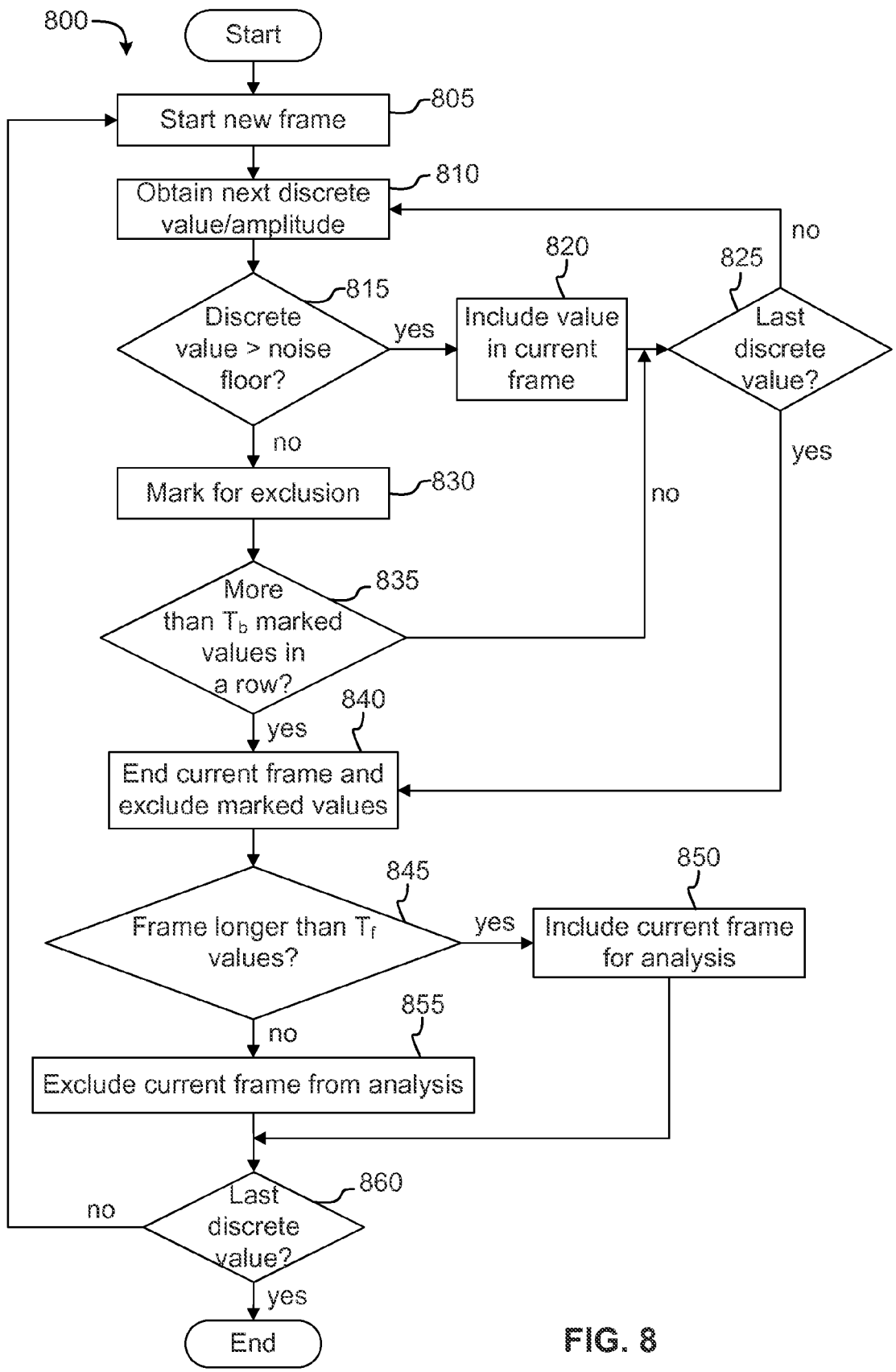
FIG. 8 is a flowchart illustrating a process for isolating frames of an audio signal according to an exemplary embodiment.

FIG. 8 illustrates an exemplary process 800 for isolating frames of an audio signal, specifically the preprocessed and normalized audio signal. In an embodiment, process 800 illustrates an embodiment of step 710 of process 700. At step 805, a new frame starts. At step 810, a discrete value from the preprocessed and normalized audio signal is extracted. At step 815, the processor module 120 determines whether this value represents an amplitude greater than a predetermined noise floor, such as a default noise floor value of −22 dBFS. As will be recognized, other values besides this default value may be used for the noise floor. If the amplitude is less than the noise floor, then the process 800 proceeds to step 830, where the discrete value is marked for exclusion from analysis. If the amplitude is greater, then the process 800 proceeds to step 820.

At step 820, the discrete value is included in the current frame. At step 825, the processor module 120 determines whether the current discrete value is the last discrete value in the preprocessed and normalized audio signal frame. If the last discrete value has been obtained, then process 825 proceeds to step 840. If there are more discrete values left in the signal, then process 825 returns to step 810 with the next discrete value.

Returning to step 830, the discrete value is marked for exclusion. At step 835, the processor module 120 determines whether the number of consecutive marked discrete values is greater than a predetermined threshold number of consecutive marked discrete values, $T_b$. As just one example, the predetermined threshold length for consecutive marked values could be 30 values, though other amounts are possible as will be recognized by those skilled in the relevant art(s). If the number of consecutive marked discrete values is less than the predetermined length threshold, then the process 835 proceeds to step 825 to check if the last discrete value has been obtained. Otherwise, process 835 proceeds to step 840.

At step 840, the current frame is complete and the marked discrete values are excluded from analysis. At step 845, the processor module 120 determines whether the completed frame has a minimum number of discrete values, denoted as the minimum frame length, $T_f$. In an embodiment, the processor module 120 compares the number of discrete values in the completed frame with the minimum frame length $T_f$. If the number of discrete values does not exceed the minimum, then the frame is filtered out at step 855 and not kept for later analysis. If the number of discrete values exceeds the minimum frame length $T_f$, then the processor module 120 keeps the frame for analysis at step 850.

At step 860, the processor module 120 determines whether the current discrete value is the last discrete value in the preprocessed and normalized generated audio signal frame. If the current discrete value is the last, then the process 800 ends. If there are additional discrete values beyond the frame, then the process 800 returns to step 805 and continues until the last discrete value is obtained, thereby resulting in a frame set corresponding to the remaining audio signal.

Returning to process 700 in FIG. 7, at step 715 the remaining frames are transformed to the frequency domain, for example performed by the processor module 120. In an embodiment, the frames remaining after step 710 are transformed by using an FFT. The FFT may be of size 512 using a Taylor window, performed on each frame that was not filtered out at step 710. Those skilled in the relevant art(s) will recognize that the FFT may be calculated using other methods and/or parameters without departing from the scope of the disclosure.

At step 720, amplitude spectra are extracted from the frequency domain audio signal on a frame-by-frame basis (for those frames that were not filtered out). In an embodiment, the amplitude spectrum of the audio signal corresponding to a frame may be grouped based on various frequency ranges. For example, a first group may include frequencies from 30 Hz to 85 Hz, a second group may include frequencies from 100 Hz to 270 Hz, and a third group may include frequencies from 2.4 kHz to 2.6 kHz. These ranges are approximate, and those skilled in the relevant art(s) will recognize that the groups may include other frequencies, and/or more or less groups may be used, without departing from the scope of the disclosure.

In addition, at step 720 the highest amplitudes from each range are calculated and stored. In an embodiment, the three highest amplitudes from each range are taken—three from the first group, three from the second group, and three from the third group. These values may be represented, for example, in matrices—the first group being $A_{vL}=[A_{vL1}, A_{VL2}, A_{vL3}]$, the second group being $A_L=[A_{L1}, A_{L2}, A_{L3}]$, and the third group being $A_M=[A_{M1}, A_{M2}, A_{M3}]$. The difference in highest amplitudes may be taken, for example the first group from the second group, and the second group from the third group. Following the above example, this may be characterized as $d_{LvL}=A_L-A_{vL}$ and $d_{ML}=A_M-A_L$. Once the difference has been taken, an inner scalar product is taken of the resulting $d_{LvL}$ and $d_{ML}$. The result of the inner scalar product is in turn divided by the number of highest amplitudes to determine a mean, $d_{mean}$; in this example, that would be 3 highest amplitudes.

The resulting mean $d_{mean}$ is used at step 725 to determine if the generated audio signal is from a live audio source or from a playback audio source. This determination may be performed separately for each frame that was not filtered out at step 710. In an embodiment, the processor module 120 compares $d_{mean}$ with an amplitude threshold value $T_{thres}$, for example −10 by default. As will be recognized by those skilled in the relevant art(s), other values may be set in place of this default threshold value. If $d_{mean}$ is greater than the amplitude threshold value $T_{thres}$, the instant frame is likely to be from a playback audio source. If $d_{mean}$ is less than or equal to the amplitude threshold value $T_{thres}$, the instant frame is likely to be from a live audio source.

The comparison at step 725 is repeated for each frame that was not filtered out at step 710. If the processor module 120 determines that more than half of the compared frames are likely from a playback audio source, then the processor module 120 concludes that the generated audio signal is likely to be from a playback audio source. Otherwise, the processor module 120 concludes that the generated audio signal is likely from a live audio source.

Figure 9:
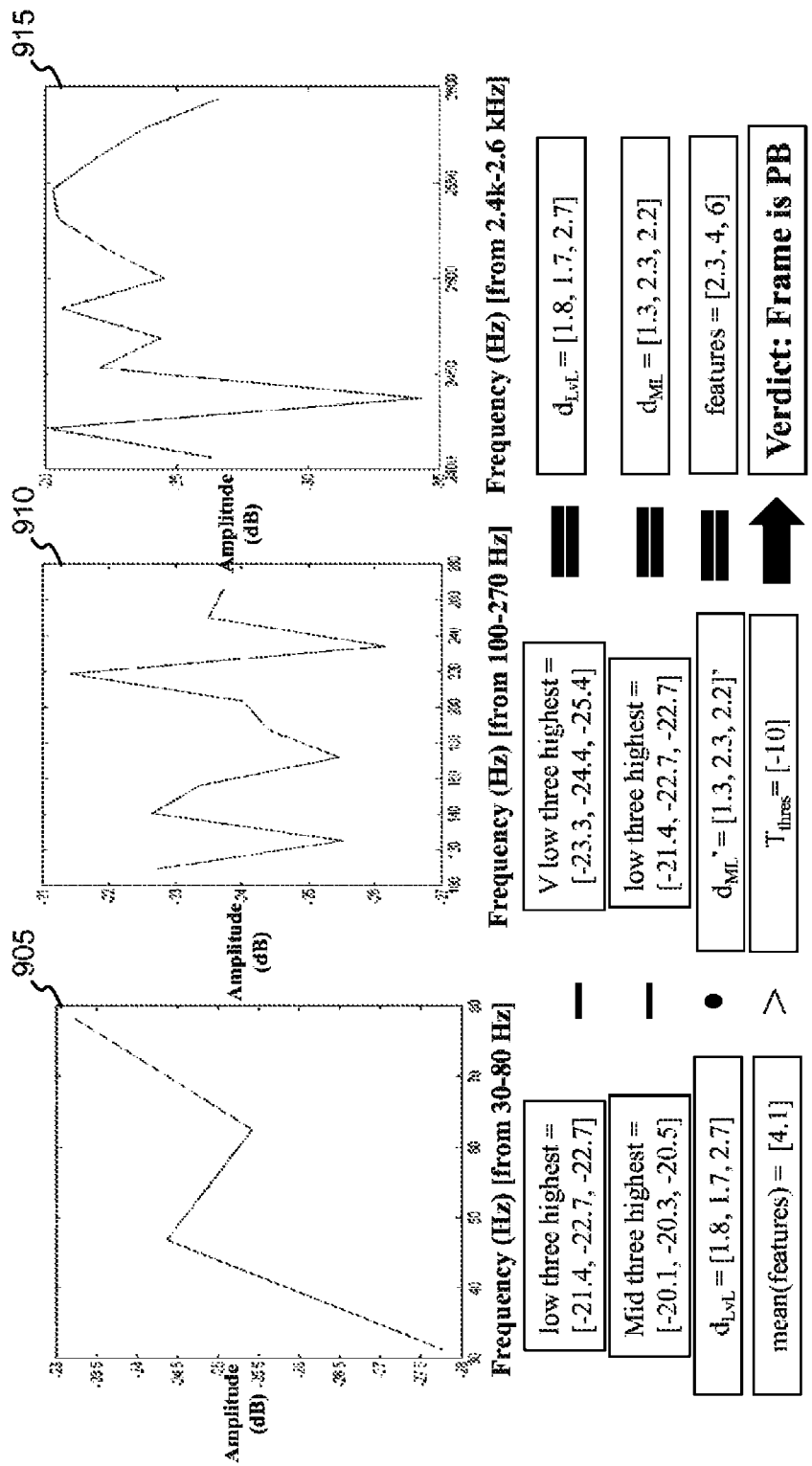
FIG. 9 illustrates exemplary graphs of an amplitude spectrum of an audio signal, according to an exemplary embodiment.

FIG. 9 illustrates graphs of the amplitude spectrum of a specific frame of a generated audio signal for three groups of frequencies according to an exemplary embodiment. Graph 905 shows the amplitude spectrum corresponding to the first group of frequencies for a given frame of a generated audio signal, for example the generated audio signal discussed above with respect to FIGS. 7 and 8. Graph 910 shows the amplitude spectrum corresponding to the second group of frequencies for the frame. Graph 915 shows the amplitude spectrum corresponding to the third group of frequencies for the frame. FIG. 9 shows that the computed mean of the three highest amplitudes from each group is greater than a predetermined threshold, such as the amplitude threshold value $T_{thres}$ discussed in FIG. 7 above. Based on this result in FIG. 9, it is likely that the frame is from a playback audio source. This process is then repeated for the rest of the frames that were not filtered out, as discussed above with respect to step 725 of FIG. 7.

Example Computer System

The exemplary embodiments above have been described as being embodied in electronic devices such as mobile phones, smartphones, personal digital assistants, laptop computers, tablet computers, and/or any electronic device in which user authentication is necessary or desirable. Some of these embodiments can be implemented, for example, using one or more well-known computer systems, such as computer system 1000 shown in FIG. 10. Computer system 1000 can be any well-known computer capable of performing the functions described herein, such as computers available from International Business Machines, Apple, Sun, HP, Dell, Sony, Toshiba, etc.

Computer system 1000 includes one or more processors (also called central processing units, or CPUs), such as a processor 1004. Processor 1004 is connected to a communication infrastructure or bus 1006.

One or more processors 1004 may each be a graphics processing unit (GPU), a digital signal processor (DSP), or any processor that is designed to rapidly process mathematically intensive applications on electronic devices. The one or more processors 1004 may have a highly parallel structure that is efficient for parallel processing of large blocks of data, such as mathematically intensive data common to computer graphics applications, images and videos, and digital signal processing.

Computer system 1000 also includes user input/output device(s) 1003, such as monitors, keyboards, pointing devices, etc., which communicate with communication infrastructure 1006 through user input/output interface(s) 1002.

Computer system 1000 also includes a main or primary memory 1008, such as random access memory (RAM). Main memory 1008 may include one or more levels of cache. Main memory 1008 has stored therein control logic (i.e., computer software) and/or data.

In an optional embodiment, computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 includes a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 reads from and/or writes to removable storage unit 1018 in a well-known manner.

Figure 10:
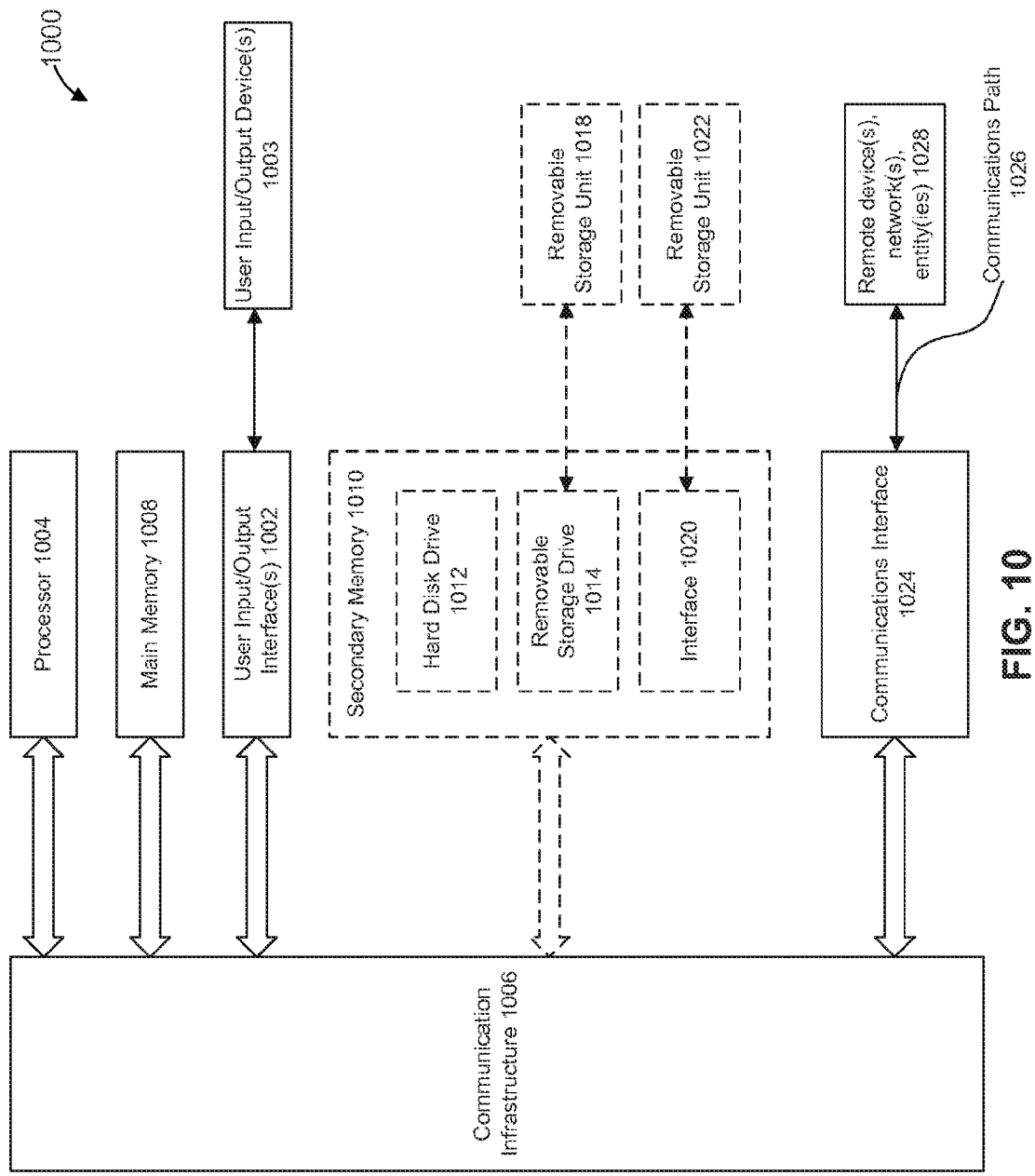
FIG. 10 is an example computer system useful for implementing various embodiments.

Secondary memory 1010 may include other means, instrumentalities or other approaches for allowing computer programs and/or other instructions and/or data to be accessed by computer system 1000. Such means, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. As shown in FIG. 10, secondary storage devices or memory 1010, as well as removable storage units 1018 and 1022 are optional and may not be included in certain embodiments.

Computer system 1000 may further include a communication or network interface 1024. Communication interface 1024 enables computer system 1000 to communicate and interact with any combination of remote devices, remote networks, remote entities, etc. (individually and collectively referenced by reference number 1028). For example, communication interface 1024 may allow computer system 1000 to communicate with remote devices 1028 over communications path 1026, which may be wired and/or wireless, and which may include any combination of LANs, WANs, the Internet, etc. Control logic and/or data may be transmitted to and from computer system 1000 via communication path 1026.

In an embodiment, a tangible apparatus or article of manufacture comprising a tangible computer useable or readable medium having control logic (software) stored thereon is also referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), causes such data processing devices to operate as described herein.

Based on the descriptions contained in this disclosure, it will be apparent to persons skilled in the relevant art(s) how to make and use the invention using data processing devices, computer systems and/or computer architectures other than that shown in FIG. 10. In particular, embodiments may operate with software, hardware, and/or operating system implementations other than those described herein.

CONCLUSION

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for authenticating a user, comprising:

comparing, by a hardware processor of an authentication device, a power spectrum within a frequency range of a first input audio signal to a criterion;

determining, by the hardware processor, a first audio determination indicating whether the first input audio signal is one of a live audio signal or a playback audio signal based on the comparison; and determining a first confidence score based on the first audio determination, wherein the first confidence score indicates a confidence level as to whether the input audio signal represents the first audio determination, wherein if the first confidence score indicates with high confidence that the first input audio signal is the live audio signal, then performing a text-based voice authentication of the live audio signal for determining access to a device comprising the hardware processor, if the first confidence score indicates with high confidence that the first input audio signal is the playback audio signal, then employing one or more security countermeasures, and if the first confidence score indicates a medium confidence that the first input audio signal is either the playback audio signal or the live audio signal, then prompting a user to provide a second audio signal for further analysis, wherein the further analysis comprises:
  determining a second audio determination indicating whether a second audio signal is one of the live audio signal or the playback audio signal; and
  determining a second confidence score based on the second audio determination, wherein
  if the second confidence score indicates with high confidence that the second audio signal is the live audio signal, then performing the text-based voice authentication for determining access to the device comprising the hardware processor; and
  if the second confidence score indicates medium confidence or high confidence that the second audio signal is the playback audio signal, then employing the one or more security countermeasures.

2. The method of claim 1, the comparing comprising:
  comparing an orientation of a slope of the power spectrum within the frequency range to the criterion, wherein the criterion comprises an orientation of a slope of a power spectrum within the frequency range of the live audio signal.

3. The method of claim 2, the determining further comprising:
  determining that the first input audio signal is the live audio signal if the orientation of the slope meets the criterion.

4. The method of claim 3, wherein the frequency range is of frequencies lower than 300 Hz.

5. The method of claim 3, wherein the frequency range is from 25 Hz to 300 Hz.

6. The method of claim 1, further comprising: if the text-based voice authentication determines that the first input audio signal is the live audio signal and includes an audio password matching a user enrollment audio signal, unlocking the device comprising the hardware processor.

7. The method of claim 1, wherein the one or more security countermeasures comprise locking the device comprising the hardware processor after the first confidence score and the second confidence score has been determined.

8. The method of claim 1, wherein the first confidence score is based on both an audio confidence score associated with a confidence as to whether the first input audio signal is one of the live audio signal or the playback audio signal, and a password confidence score as to whether a received password of the first input audio signal matches a previously stored voice password.

9. A system for authenticating a user, comprising:
  a memory; and
  at least one processor coupled to the memory and configured to:
    compare a power spectrum within a frequency range of first input audio signal to a criterion;
    determine a first audio determination indicating whether the first input audio signal is one of a live audio signal or a playback audio signal based on the comparison; and
    determine a first confidence score based on the first audio determination, wherein the first confidence score indicates a confidence level as to whether the input audio signal represents the first audio determination, wherein:
      if the first confidence score indicates with high confidence that the first input audio signal is the live audio signal, the at least one processor is further configured to perform a text-based voice authentication of the live audio signal for determining access to a device comprising the at least one processor,
      if the first confidence score indicates with high confidence that the first input audio signal is the playback audio signal, the at least one processor is further configured to employ one or more security countermeasures,
      if the first confidence score indicates with medium confidence that the first input audio signal is either the playback audio signal or the live audio signal, the at least one processor is further configured to prompt a user to provide a second audio signal for further analysis, wherein the further analysis comprises the at least one processor being configured to:
        determine a second audio determination indicating whether a second audio signal is one of the live audio signal or the playback audio signal; and
        determine a second confidence score based on the second audio determination, wherein:
          if the second confidence score indicates with high confidence that the second audio signal is the live audio signal, the at least one processor is further configured to perform the text-based voice authentication for determining access to the device comprising the at least one processor; and
          if the second confidence score indicates medium confidence or high confidence that the second audio signal is the playback audio signal, the at least one processor is further configured to employ the one or more security countermeasures.

10. The system of claim 9, wherein the at least one processor is further configured to:
  compare a difference between a first average peak of a first frequency range of the power spectrum and a second average peak of a second frequency range of the power spectrum to a first criterion of the criteria, wherein the first criterion comprises a difference between an average peak corresponding to the power spectrum for the first frequency range of the input audio signal and an average peak corresponding to the power spectrum for the second frequency range of the input audio signal, according to different thresholds.

11. The system of claim 10, wherein, to determine the first audio determination, the at least one processor is configured to:
  determine that the first input audio signal is the live audio signal if the difference between the first average peak and the second average peak in the input audio signal is larger than the first criterion.

12. The system of claim 11, wherein the first frequency range corresponding to the power spectrum is from 80 Hz to 400 Hz and the second frequency range corresponding to the power spectrum is from 1.1 kHz to 2.4 kHz.

13. The system of claim 10, wherein, to compare, the at least one processor is further configured to:
  compare an orientation of a slope of the power spectrum within a third frequency range to a second criterion of the criteria, wherein the second criterion comprises an orientation of the slope of the power spectrum within the frequency range of the live audio signal corresponding to the third frequency range.

14. The system of claim 13, wherein, to determine the first audio determination, the at least one processor is further configured to:
  determine that the first input audio signal is the live audio signal if the difference between the first average peak and the second average peak in the first input audio signal is larger than the first criterion of the criteria and the orientation of the slope of the power spectrum of the first input audio signal corresponding to the third frequency range meets the second criteria.

15. The system of claim 14, wherein the third frequency range is from 25 Hz to 300 Hz.

16. A method, comprising:
  comparing, by a hardware processor of an authentication device, an amplitude spectrum within a frequency range of first input audio signal to a criterion;
  determining, by the hardware processor, a first audio determination indicating whether the first input audio signal is one of a live audio signal or a playback audio signal based on the comparison; and
  determining a first confidence score based on the first audio determination, wherein the first confidence score indicates a confidence level as to whether the input audio signal represents the first audio determination, wherein:
    if the first confidence score indicates with high confidence that the first input audio signal is the live audio signal, then performing a text-based voice authentication of the live audio signal for determining access to a device comprising the hardware processor,
    if the first confidence score indicates with high confidence that the first input audio signal is the playback audio signal, then employing one or more security countermeasures, and
    if the first confidence score indicates with medium confidence that the first input audio signal is either the playback audio signal or the live audio signal, then prompting a user to provide a second audio signal for further analysis, wherein the further analysis comprises:
      determining a second audio determination indicating whether a second audio signal is one of the live audio signal or the playback audio signal; and
      determining a second confidence score based on the second audio determination, wherein:
        if the second confidence score indicates with high confidence that the second audio signal is the live audio signal, then performing the text-based voice authentication for determining access to the device comprising the hardware processor; and
        if the second confidence score indicates with medium confidence or high confidence that the second audio signal is the playback audio signal, then employing the one or more security countermeasures.

17. The method of claim 16, the comparing comprising:
  grouping the amplitude spectrum into a first group having a first frequency range, a second group having a second frequency range, and a third group having a third frequency range, wherein the third frequency range is greater than the second frequency range and the second frequency range is greater than the first frequency range;
  determining a number of highest amplitudes in the first group, highest amplitudes in the second group, and highest amplitudes in the third group;
  computing a first difference between the highest amplitudes of the second group and the highest amplitudes of the first group and a second difference between the highest amplitudes of the third group and the highest amplitudes of the second group;
  determining a mean of the first and second differences; and
  determining that the first input audio signal is the playback audio signal when the mean is greater than a predetermined threshold that comprises the criterion.

18. The method of claim 17, the determining the mean comprising:
  taking an inner scalar product of the first and second differences; and
  dividing the inner scalar product by a selected number of highest amplitudes.

19. The method of claim 16, further comprising:
  extracting a first portion of the first input audio signal, the first portion comprising a portion of the first input audio signal; and
  filtering out non-essential audio segments within the first portion failing to meet a minimum amplitude requirement and a specific length requirement to produce a remaining frame set.

20. The method of claim 19, further comprising:
  calculating the amplitude spectrum of each frame from among the remaining frame set to derive computed mean values; and
  determining that the first input audio signal is the playback audio signal when the computed mean values for a predetermined percentage of frames from the remaining frame set are each found to be greater than a predetermined threshold comprising the criterion based on the comparing.

21. The method of claim 16, further comprising:
  analyzing the first input audio signal in a frequency domain.

22. The method of claim 16, further comprising:
  repeating the comparing and determining at pre-specified time intervals for continuous (time-based) authentication.

23. The method of claim 16, further comprising:
  performing the comparing and determining when a previously specified application stored in a memory of the device comprising the hardware processor is sought to be launched for active (activity-based) authentication.

24. The method of claim 1, wherein one of the one or more security countermeasures comprises collecting biometric data.

25. A system, comprising:
  a memory; and
  at least one processor coupled to the memory and configured to:
    compare an orientation of a slope of a power spectrum within a frequency range of an input audio signal to a criterion, wherein the criterion comprises an orientation of a slope of a power spectrum within the frequency range of the input audio signal;
    determine an audio determination as to whether the input audio signal is one of a live audio signal or a playback audio signal based on the comparison; and
    determine a confidence score corresponding to the audio determination, wherein the confidence score indicates a confidence level as to whether the input audio signal represents the audio determination, wherein:

if the confidence score indicates with high confidence that the input audio signal is the live audio signal if the orientation of the slope meets the criterion, the at least one processor is further configured to perform a text-based voice authentication of the live audio signal for determining access to a device comprising the processor, if the confidence score indicates with high confidence that the input audio signal is the playback audio signal, the at least one processor is further configured to employ one or more security countermeasures, and if the confidence score indicates with medium confidence that the input audio signal is either the playback audio signal or the live audio signal, the at least one processor is further configured to prompt a user to provide a second audio signal for further analysis.

* * * * *

UNITED STATES PATENT AND TRADEMARK OFFICE
CERTIFICATE OF CORRECTION

PATENT NO. : 9,767,266 B2
APPLICATION NO. : 14/136664
DATED : September 19, 2017
INVENTOR(S) : Hu et al.

Page 1 of 1

It is certified that error appears in the above-identified patent and that said Letters Patent is hereby corrected as shown below:

On the Title Page

Please change the name of the Primary Examiner from "Monjour Rahim" to --Monjur Rahim--.

In item (74), please replace "Sterge, Kessler, Goldstein & Fox P.L.L.C." with --Sterne, Kessler, Goldstein & Fox P.L.L.C.--.

In the Claims

In Column 17, Line 16, please replace "range of first input audio signal" with --range of a first input audio signal--.

Signed and Sealed this
Twenty-fourth Day of April, 2018

Andrei Iancu
*Director of the United States Patent and Trademark Office*